United States Patent

[11] 3,540,715

[72] Inventors Charles E. Strother
Rockville;
Frank I. Whitten, Bethesda, Maryland
[21] Appl. No. 749,099
[22] Filed July 31, 1968
[45] Patented Nov. 17, 1970
[73] Assignee the United States of America as represented by the Secretary of the Navy

[54] SHOCK LIMITING DEVICE
5 Claims, 3 Drawing Figs.

[52] U.S. Cl. .................................................. 267/1
[51] Int. Cl. .................................................. F16f 1/04
[50] Field of Search ........................................ 267/131, 133, 135, 180, 167, 134, 136, 142, 143, 156, 179

[56] References Cited
UNITED STATES PATENTS
2,635,282 4/1953 Trammell et al .............. 267/1
2,681,823 6/1954 Gaisman ....................... 267/1

Primary Examiner—James B. Marbert
Attorney—L. A. Miller, Q. E. Hodges and A. Sopp

ABSTRACT: A shock absorption device employing one or more spiral spring elements made of spring steel each wound upon itself around a stud with one free end of each spring attached to or supporting the load to be protected. The springs may be arranged close together in pairs having parallel axes. A checking element is urged between the springs as they unwind under shock for preventing free return or "snap back" of the springs to their initial positions.

Patented Nov. 17, 1970   3,540,715
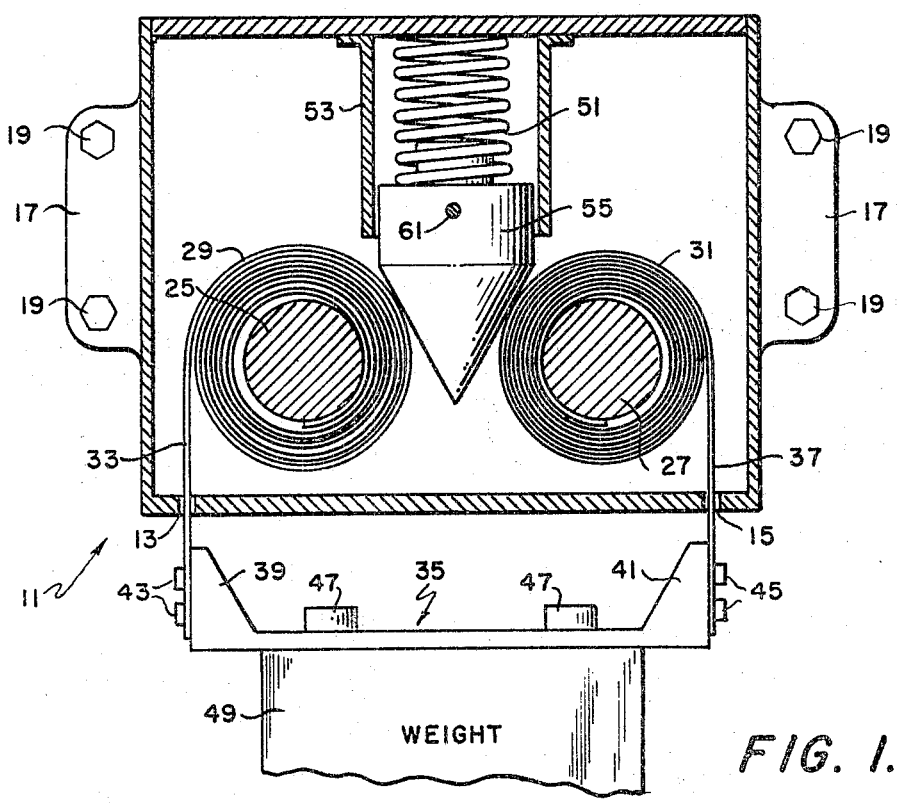
FIG. 1.
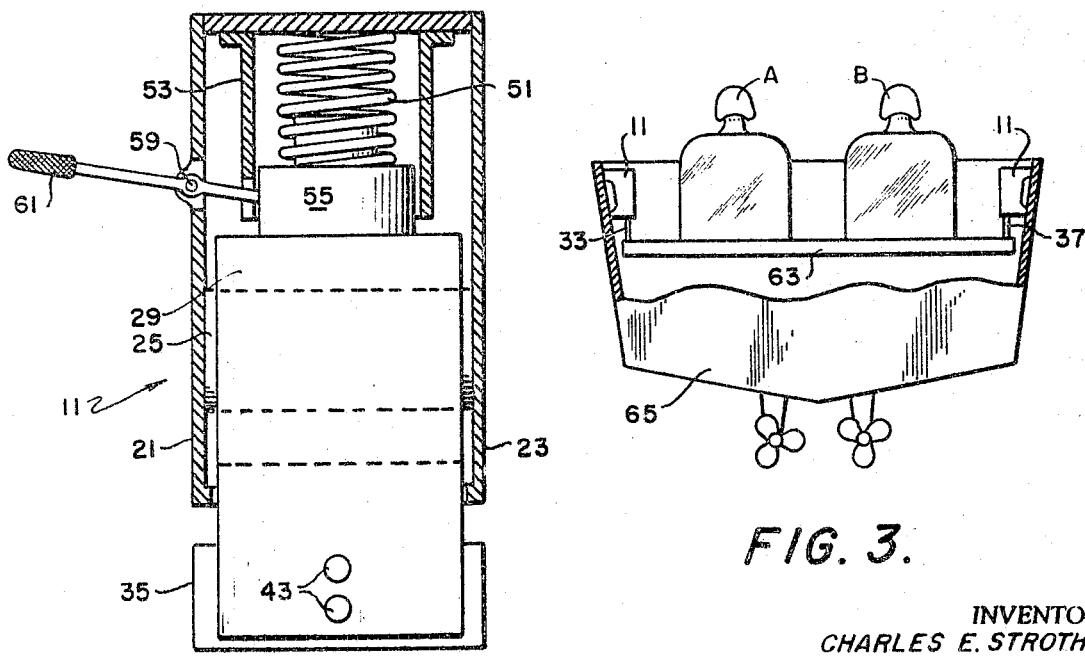
FIG. 2.
FIG. 3.
INVENTORS
CHARLES E. STROTHER
FRANK I. WHITTEN
BY  Hodges
    Albert Hopp
ATTORNEYS

SHOCK LIMITING DEVICE

The invention described herein may be manufactured and used by or for the Government of the United States of America for governmental purposes without the payment of any royalties thereon or therefor.

BACKGROUND AND SUMMARY

Numerous devices have been employed to protect personnel and equipment in vehicles from shock due to explosion or impact causing sudden movement of the vehicle. The need and desirability for such devices for protection, of personnel, particularly those who are standing and not sitting, is obvious. In the past the design of shock absorbers has often been complex and expensive.

The present invention affords shock absorption in a simple manner, thru employment of one or more lightweight devices having spiral springs supporting or attached to the load to be protected. Upon occurrence of shock, the inertia of the load acts against the restoring force of each spring so that the energy of the shock is stored in the spring during its unwinding action thereby producing essentially constant acceleration on the load. Snap back of the spring at the termination of the shock is prevented by a simple adjustable check.

In order to protect personnel in boats or land vehicles from injury due to explosions or impacts tending to thrust the vehicle upward, a plurality of devices made according to the present invention may be arranged to support the seats or platforms on which the personnel are positioned. These devices may be located at any suitable number of support points of the platform or seat. As the vehicle is thrust upward due, say, to explosion, the springs unwind due to inertia of the supported load and dissipate the force of the explosion.

In a more general sense, the device of the present invention may be employed singly or in groups for shock absorption by attachment of one or more of the devices to the load in one or more directions to resist the inertia of the load under shock.

Accordingly, the objects of the present invention are to provide:

Protection of personnel and equipment from shock;

Simple and inexpensive shock absorbers easily mounted in vehicles of all types in various positions in relation to the loads to be protected against shock;

A lightweight shock absorbing device of relatively small size in relation to the extent of shock protection provided, thus enabling large payloads when in use and easy stowage of the devices when not in use.

Other objects, features, and advantages according to the invention will be better understood by reference to the following description and accompanying drawings.

BRIEF DESCRIPTION OF THE DRAWINGS

FIG. 1 is a modified view in longitudinal cross section of a device according to the present invention, and FIG. 2 is a modified view in transverse cross section of the device of FIG. 1 thru cut 2-2;

FIG. 3 is a stern cutaway view of a watercraft employing devices of the invention for shock absorption.

DETAILED DESCRIPTION

Referring to FIGS. 1 and 2, the device according to the invention comprises a housing 11 in the general shape of a box having openings 13 and 15 in one wall. The housing may be fabricated of steel, aluminum, fiberglass, etc., and has on each side integral brackets 17 for attachment via bolts 19 to a wall, stanchion, floor, or other fixture. The housing may be mounted on the vehicle in any suitable manner, however. If desired, housing 11 may be provided with doors, openings, etc., for easy inspection and maintenance.

For purposes of illustration and not limitation, the housing 11 is oriented in FIGS. 1 and 2 so that the holes, 13, 15 are in its bottom and two opposing sides of the housing designated 21 and 23 are essentially upright.

Within the housing 11 there are provided two spaced apart studs 25 and 27, arranged parallel to each other. Each stud is rigidly affixed at its ends to walls 21 and 23 in any suitable manner.

Essentially identical spiral springs 29 and 31 made of spring steel such as 301 stainless steel are respectively mounted on studs 25 and 27 for opposite directions of winding rotation. The springs are also mounted to be coplanar with their peripheries spaced apart, and the springs 29 and 31 are laterally confined by walls 21 and 23. The radially innermost end of each spring is not attached to the stud but is freely movable. The outermost end 33 of spring 29 is passed through the hole 13 to a clamp 35, and the outermost end 37 of spring 31 is passed thru hole 15 to the clamp 35. Clamp 35 is essentially a U-shaped channel made of rigid material and has opposing legs 39 and 41 to which spring ends 33 and 37 are respectively attached by means of bolts or rivets 43 and 45.

The main body portion of the clamp 35 is provided with bolts 47 or any other suitable means for attachment of the clamp to a load 49. The load 49 may be any object to be protected against shock, e.g. personnel, equipment, etc.

A compression spring 51 is positioned in a tube 53 extending downwardly from the underside of the top of the housing. A wedge 55 is attached in any suitable manner to the bottom end of the spring 51. The wedge 55 is urged against the contrarotating spiral springs 29 and 31 by the spring 51 for engagement with the outer surfaces of springs 29 and 31, so that as the springs 29 and 31 unwind and become smaller in radius, the wedge is extended under the force of spring 51 further into the space between the outer confines of the spiral springs. The wedge does not appreciably resist the unwinding action of the springs, but upon initiation of winding of the springs whose radii are then increasing, self-energizes to provide frictional checking to prevent appreciable return or winding of the springs under their own restoring force. Thus, the action of the wedge prevents "snap back" of the springs.

A lever 57 extends thru an opening in the side 21 of the housing and is mounted on a pivot 59. The inner end of the lever 57 is attached in any suitable manner to the wedge 55, and the outer end of the lever 57 has a handle 61. Operating personnel may manipulate the lever 57 to slowly withdraw the wedge 55 from its position wedged between the springs after shock loading, in order to return the springs in a controlled manner to their preshock positions.

As shown in FIG. 3, the shock absorbing device of the invention (identified by numeral 11) may be employed in plural numbers for shock protection. In FIG. 3, two personnel A and B are shown located on a bench 63 extending athwart a boat 65. Spiral springs 25 and 27 extend from each housing 11 and are clamped in any suitable manner to each end of the seat 63. Obviously, if each device of the invention is fabricated to absorb a predetermined shock loading, a predetermined plurality of devices may be employed in relation to a given load to be shock protected.

OPERATION

In operation, the load 49 (e.g. personnel A and B, on bench 63 in FIG. 3) is to be protected against shock which causes movement of the vehicle or structure to which one or more devices of the invention are attached. Load 49 has inertia. Therefore, should an explosion occur beneath boat 65 causing the boat to be thrust upwardly at high initial velocity, the inertia of the load causes spiral springs 29 and 31 in each device to unwind about studs 25 and 27. The springs 29 and 31 are inherently prestressed to their initial wound positions on the studs and thus, the springs resist the inertia of the load by their own restoring forces.

As the load 49 (or seat 63) moves in essentially constant acceleration in relation to the devices which are moving with the upwardly thrusted vehicle, the springs 29 and 31 continue to unwind, and the wedge 55 is urged between the springs, thus preventing spring "snap back". At the end of the shock loading cycle, the springs remain extended under the checking action of the wedge 55. Thereafter, lever 57 may be manipulated by operating personnel so that the wedge is slowly withdrawn from between the springs, thereby enabling rewinding of the springs in opposite sense of rotation to their initial positions.

It is to be understood that the invention is not limited to the exact details of construction shown and described, for obvious modifications will occur to those skilled in the art.

We claim:

1. A shock limiting device comprising:

a housing having openings therein;

support means located in said housing;

spiral spring means freely mounted on said support means, said spring means having the characteristic of tending to wind under its restoring force inwardly upon itself, the outer end elements extending thru the openings of said housing;

means for attaching a load to be shock protected to said outer end elements of said spring means; and check means for preventing winding of the spring means under their restoring force of the spring means after termination of unwinding due to shock loading.

2. The device according to claim 1 wherein:

said support means comprises a pair of parallel spaced apart studs mounted in said housing; and said spiral spring means comprises a spiral spring freely mounted on each stud.

3. The device according to claim 2 wherein said springs are mounted spaced apart from each other in the same plane of winding rotation, the sense of rotation of the respective springs being opposite; and wherein said check means comprises a wedge and resilient means biasing said wedge into engagement with the periphery of each spring as the springs unwind in opposite directions, said wedge means being self-energizing to prevent winding of said springs under their restoring forces.

4. The device according to claim 3 including a lever attached to said wedge for retracting the wedge to enable winding of said springs.

5. The device according to claim 4 including means for attaching said device to an environmental element.